Feb. 5, 1957 W. G. ROMAN ET AL 2,780,740
LINEAR MOTION DEVICE
Filed March 25, 1955 5 Sheets-Sheet 1

WITNESSES
INVENTORS
Walter G. Roman &
Robert C. Robinson.
ATTORNEY

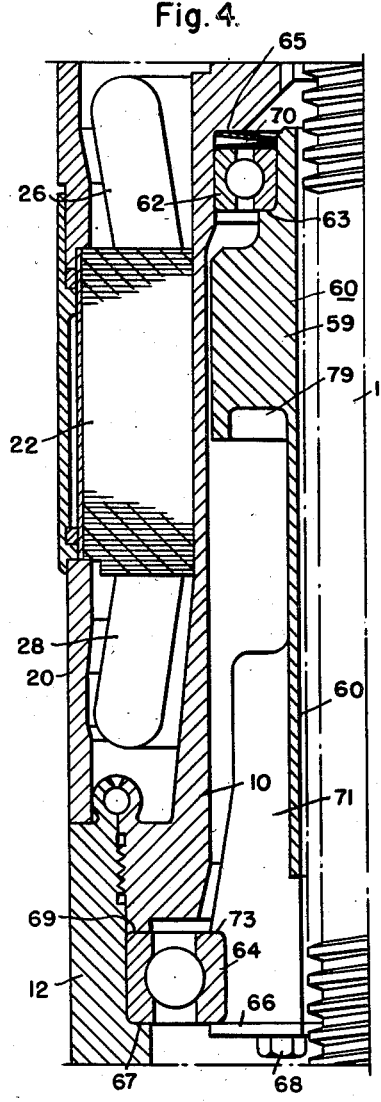
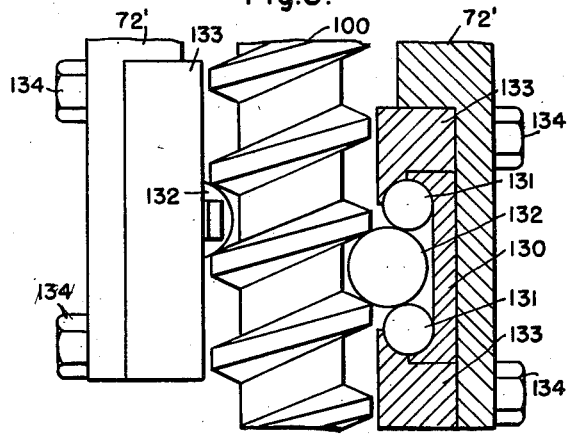
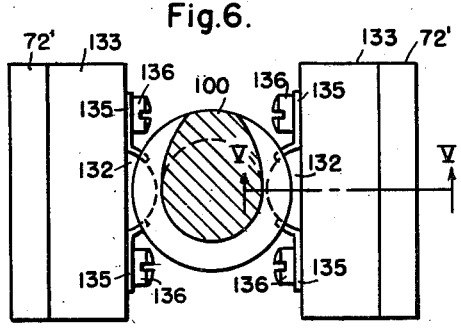
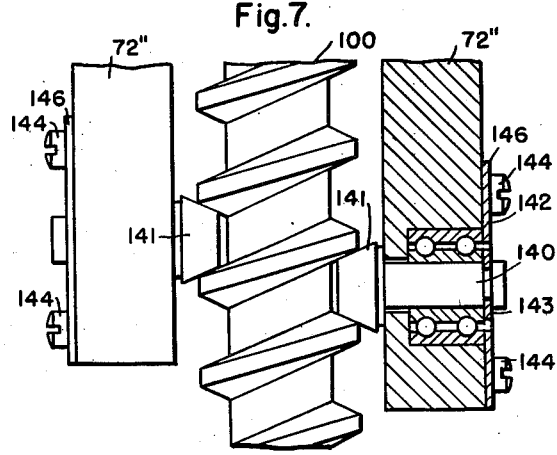

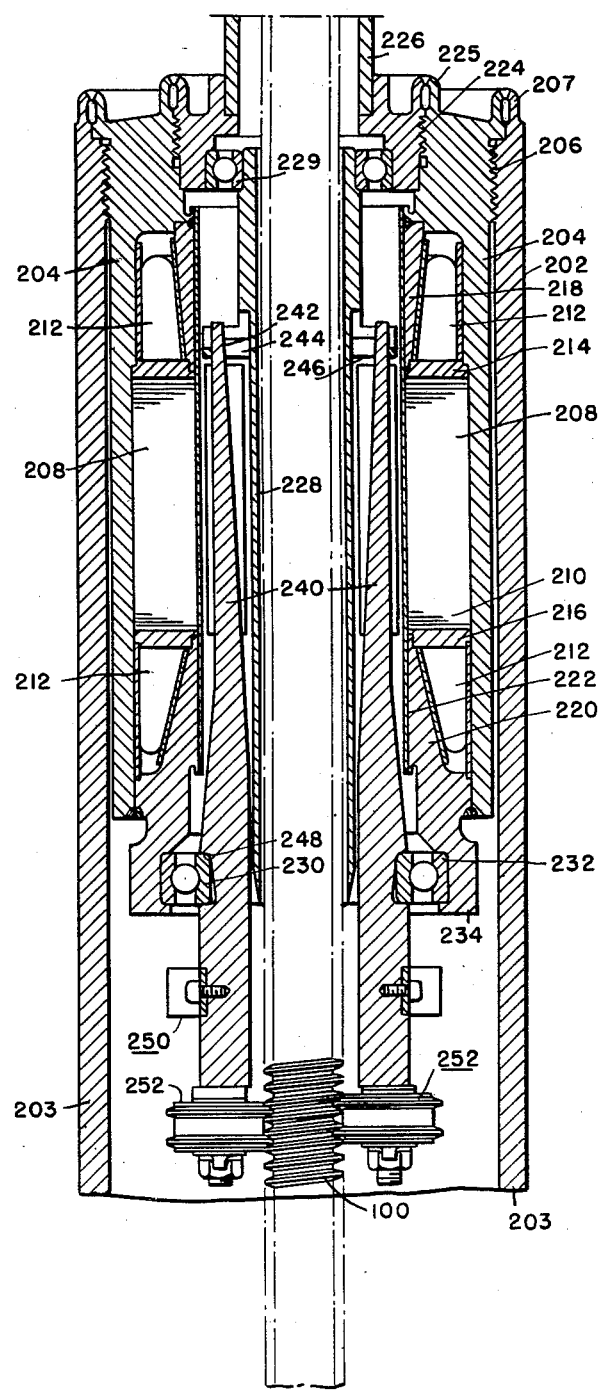

United States Patent Office 2,780,740
Patented Feb. 5, 1957

2,780,740

LINEAR MOTION DEVICE

Walter G. Roman, Pittsburgh, and Robert C. Robinson, Upper St. Clair Township, Allegheny County, Pa., assignors to Westinghouse Electric Corporation, East Pittsburgh, Pa., a corporation of Pennsylvania Application March 25, 1955, Serial No. 496,688

22 Claims. (Cl. 310—67)

Our invention relates to linear motion devices and, more particularly, to linear motion devices incorporating a lead screw driven by an electric motor and expanding nut, and having means for disconnecting the lead screw and allowing it to move free of the motor and expanding nut.

The problem of positioning an element movable in a linear direction arises in various types of industrial equipment and various means have been suggested to solve it. The problem is further complicated in some instances where it is desired to remotely operate such elements in a system a great distance from the control point, such as in a system handling dangerous and explosive substances, which necessitates the use of remote control for the linear positioning device. An example is the operation of a complex chemical plant where it is necessary to position numerous valves to control the flow of different substances from a remote location. Also, when dangerous or explosive conditions develop, it is desirable to close many valves simultaneously so as to shut down the chemical plant.

We have solved these problems by a novel linear drive incorporating a lead screw driven by a synchronous reluctance motor and expanding nut. In addition, we have provided a unique rotor construction consisting of individual movable rotor arms on which an expanding nut is mounted so that it can be disengaged from the lead screw, and the latter driven in a linear direction by other means. In addition, we have designed our linear motion device so that it fails safe in case the power supply to the drive motor fails. When the power fails, our linear motion device will move the control element to one extreme control position automatically, without further actions on the part of the operator.

Accordingly the principal object of our invention is to provide a linear motion device having a lead screw driven by a motor with a unique segmented motor, where each segment is formed by a pivoted arm so that the lead screw can be released and driven by other means.

Another object of our invention is to provide a linear motion device having a lead screw driven by a motor with a hollow core rotor so that the lead screw can pass through the rotor.

Another object of our invention is to provide a linear motion device that is completely sealed so that it may be used in a sealed system with substantially zero leakage allowance.

Another object of our invention is to provide a linear motion device having a lead screw where the lead screw is driven by an expanding nut composed of a plurality of sectors.

Another object of our invention is to provide a linear motion device which will fail safe when its power supply is interrupted.

These and other objects and advantages of our invention will be more clearly understood by one skilled in the art to which it appertains from the following detailed description of preferred embodiments of our invention when taken in connection with the attached drawings in which:

Fig. 4 is a partial view of Fig. 1 showing the mounting of the rotor tube in the motor frame drawn to an enlarged scale;

Fig. 5 is a partial longitudinal view partly in section of a modification of our invention showing the use of balls to drive the lead screw of the embodiment shown in Fig. 1;

Fig. 6 is an end view of the modification shown in Fig. 5 with the lead screw in section;

Fig. 7 is a view similar to Fig. 5 of another modification of our invention showing the use of rotating pins to drive the lead screw of the embodiment shown in Fig. 1;

Fig. 9 is a longitudinal section of a third embodiment of our invention.

The embodiment of our invention illustrated in Figs. 1 to 4 is comprised generally of an extended tubular motor frame, a stator winding and a reluctance type of rotor rotatably mounted in the motor frame. The rotor has an enlarged portion at one end which has a hollow bore through which the lead screw may pass and a portion at the other end consisting of a plurality of pivoted arms. Sectors of an expanding nut are used for driving the lead screw in an axial direction and are attached to one end of the pivoted rotor arms. The pivoted rotor arms are spring biased so that the ends of the pivoted rotor arms adjacent the expanding nut will move outwardly and hold the sectors of the expanding nut free of the lead screw when the stator winding is deenergized. When the stator winding is energized, the other ends of the pivoted rotor arms, which form part of the reluctance rotor, will move outwardly about their pivot points, and the sectors of the expanding nut will move inwardly and engage the lead screw and drive it in an axial direction as the rotor rotates.

Figure 1:
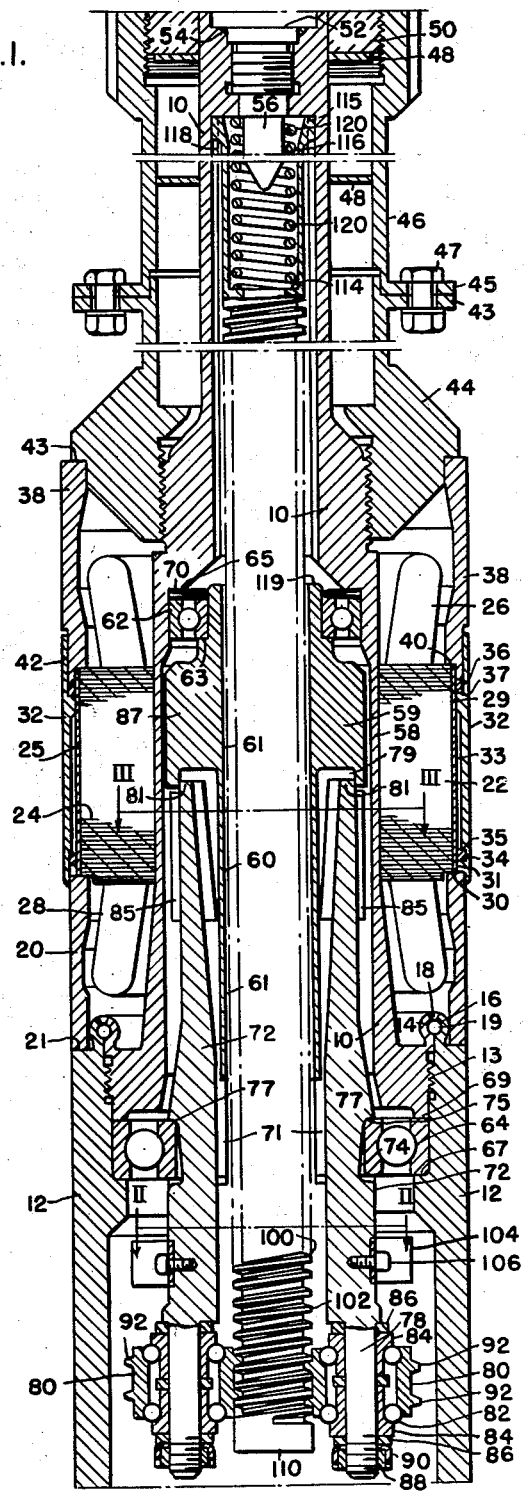
Figure 1 is a longitudinal section of one embodiment of our invention.

The stator shown in Fig. 1 may have a 3-phase, 4-pole winding, and when supplied with 3-phase alternating-current power, will cause the rotor to rotate in synchronism with the power supply. If the 3-phase alternating-current power is supplied from any well known source where the frequency may be varied, the speed of the rotor, and thus the speed of the axial movement of the lead screw, can be accurately controlled by controlling the frequency. If it is desired to lock the lead screw in any position, all that is necessary is to reduce the frequency of the 3-phase power source to zero and maintain the excitation of the stator so that there is no rotating magnetic field. If it is desired to disconnect the expanding nut from the lead screw, all that is necessary is to deenergize the stator windings, in which case the spring biasing of the pivoted rotor arms will cause the sections of the expanding nut to move out of engagement with the lead screw.

The exact position of the lead screw, and thus the position of the controlled element, will always be known because each complete cycle of the three-phase power supply will correspond to a fixed fraction of one revolution of the expanding nut. This relationship between the power supply and the lead screw can easily be supplied to a suitable indicating device which will give a direct reading of the position of the lead screw.

The embodiment of our invention illustrated in Fig. 1 is designed so that it may be operated with its motor rotor, expanding nut and lead screw immersed in any fluid in which the control element may be operating. The ability of our linear motion device to operate with its motor unit thus immersed is important because it eliminates the need for mechanical seals to isolate the motor unit from such fluid in the system. In cases where dangerous or explosive fluids are handled and leakage thus becomes serious, our linear motion device may be completely sealed, thus eliminating leakage.

The tubular motor frame 10 and lower housing 12 of our linear motion device are joined by means of a threaded connection 13. The motor frame 10 has a heavy section at its lower end on which the threaded connection 13 is formed. This heavy section gradually reduces to a relatively thinned walled section 58 of uniform cross section. The stator assembly 22 to be described later is placed on the outer surface of the section 58 of the motor frame. Thus the section 58 serves both as a support member for the stator and as a barrier to isolate the stator windings from the fluid in which our linear motion unit may be operating. The motor frame 10 enlarges into a heavy walled section at the upper end of the stator assembly 22 and then again tapers into a substantially uniform tubular shape for the remainder of its length. The motor frame 10 and housing 12 have a general tubular shape and are preferably of a corrosion-resisting material, such as stainless steel.

If it is desired to operate our linear motion device in a sealed system with substantially zero leakage allowance, the threaded connection 13 may be sealed by means of a seal weld 19. Seal weld 19 is composed of two curved converging flanges 14 and 16 on motor frame 10 and lower housing 12, respectively, which are welded together at their free ends in the area 18. This type of seal weld is more particularly described and claimed in an application titled "Weld Container" of Edward J. Kreh, Jr. and Conrad M. Ladd, filed November 17, 1953, Serial No. 392,692, and assigned to the same assignee as our invention. The lower housing 12 is connected directly to the valve body or other housing containing the element to be operated by any suitable means (not shown).

The stator assembly 22 is positioned on the outer surface of the motor frame 10. Prior to the slipping of the stator assembly 22 onto the motor frame, an annular spacer ring 20, which encloses the end turns at one end of the stator assembly and serves to accurately locate the stator assembly 22 on the motor frame, is positioned on the top surface of lower housing 12. The stator assembly is comprised of stacked stator laminations 24, of a magnetic material such as iron, which have inwardly opening slots (not shown) in which suitable stator windings are inserted. The stator windings have end turns 26 and 28 extending at each end of the stator assembly 22, respectively. The stacked stator laminations 24 may be held together as a unit by any suitable means, such as welding along their outer surfaces. A thin walled metal tube 25 preferably of a corrosion resisting material, such as stainless steel, is slipped over the outer surface of the stator laminations so as to completely enclose the stator assembly. A shoulder 30 at the lower end of the stator assembly 22 rests against the top edge of the annular spacer ring 20 and serves, in cooperation with the annular spacer ring 20, to accurately locate the stator assembly in an axial position along the outer surface of the motor frame section 10.

A second tube 32 preferably of a corrosion-resisting material, such as stainless steel is positioned around the outer surface of the first thin walled tube 25 which enclosed stator winding, and is radially spaced from the first thin wall tube 25, by two inwardly projecting ridges 29 and 31 formed on the inner surface of tube 32 adjacent its upper and lower ends, respectively, so as to enclose a small annular area 33 therebetween. The annular area 33 is sealed at its lower end by means of a sealing ring 34 of a resilient material, such as neoprene, which fits in a cooperating groove 35 formed on the inner surface of tube 32. The upper end of annular area 33 is sealed by a sealing ring 36 of similar material, which fits between a flange 37 on tube 32 and the lower end of second spacing ring 38.

A cooling medium may be circulated in the annular area 33 to cool the stator assembly by any suitable means (not shown) in those cases where the linear motion device is used in a system handling high temperature fluids. The second annular spacing ring 38 is used to enclose the upper end turns 26 of the stator assembly and is located by means of a shoulder 40 formed in its lower end which rests on the upper surface of stator assembly 22. The complete stator assembly is locked in position by means of a threaded central housing 44 which threads onto a heavy section of the motor frame section 10. An outwardly projecting flange 43 on the central housing 44 rests on the top surface of the annular ring 38 and serves to force the complete stator assembly 22 into position against the top surface of the annular spacing ring 20.

An upper housing 46 is bolted to the central housing 44 by means of bolts 47 which pass through flanges 43 and 45 on central housing 44 and the upper housing 46 respectively. Stiffening rings 48 are positioned at intervals along the outer surface of the motor frame 10 to separate the motor frame 10 and the upper housing 46 and further strengthen the motor frame 10. The annular opening between the motor frame 10 and the upper housing 46 at the top of the device is closed by means of a threaded end cap 50. The central opening at the upper end of the motor frame 10 is closed by means of a threaded plug 52 which may be sealed by a small weld 54 if it is desired to operate the linear movement in this device in a system having a zero leakage allowance. The threaded plug 52 has a rod-like projection 56 which extends into the opening in the motor frame 10 and serves to guide the spring 120 which is used to move the lead screw when the stator windings are deenergized, as will be described later.

We have thus provided a completely hermetically sealed motor frame for our linear motion device which can be attached directly to other equipment. Thus our linear motion device can be operated with its rotor and lead screw immersed in the fluid in which the equipment is operating without danger of the fluid escaping. The stator windings of our device are isolated from the fluid in which the rotor is immersed by a section 58 of the motor frame 10 described above. The section 58 of the motor frame 10 is designed to withstand extremely high pressures on the order of 2,000 pounds per square inch without requiring any additional supporting members. Yet due to the material used, it does not impair the electrical efficiency of the motor unit. We prefer to use a material having between 40 to 60 percent of the magnetic permeability of silicon steel so that the electrical efficiency of the motor is maintained and the member can be made heavy enough to withstand extreme pressures without requiring supporting members. We have found that certain stainless steels have the proper magnetic properties and, in addition, great strength. Thus our motor frame 10 serves both to isolate the stator windings and to support the remainder of the motor parts. However, this construction is more particularly described and claimed in a co-pending application titled "Motor Construction" by W. E. McCown, filed March 25, 1955, Serial No. 496,832, and assigned to the same assignee as our invention.

When it is necessary to service the stator and its windings, such service can be accomplished without breaking the hermetic seals of the motor frame since the stator assembly is slipped on over the outer surface of the motor frame. This feature is important when the fluid in the system is of a highly dangerous or explosive nature as it prevents its escape from the system. Of course, if it is necessary to remove the device from the system, the seal weld 19 can be easily broken and the motor frame 10 unscrewed from the lower housing 12 thus removing the frame 10 including the lead screw and rotor from the remainder of the system.

The rotor assembly of our invention is assembled outside of the tubular motor frame and inserted into the tubular motor frame 10 prior to the joining of the tubular motor frame 10 and lower housing 12. The rotor has a rotor tube 60, preferably of a magnetic material, such as magnetic stainless steel, and pivoted rotor arms 72 of similar material. The rotor tube 60 has an enlarged upper portion 59 which forms part of the salient pole structure required of a reluctance type of motor. The upper portion 59 may have longitudinal grooves (not shown) formed on its outer surface in order to form the salient poles referred to above. The remainder of the salient poles are formed by the rotor arms 72 which will be described later. The upper end of the rotor tube 60 (Fig. 4) is rotatably mounted by means of a ball bearing 62, the inner race of which rests on a shoulder 63 formed on the rotor tube 60, and the outer race of which rests on a shoulder 70 formed on the motor frame 10. The ball bearing 62 is not rigidly secured in position but is allowed to move longitudinally in the motor frame 10 to allow for expansion and contraction of the rotor tube 60. A V-shaped flat radial spring 65 is inserted between the outer race of ball bearing 62 and the shoulder 70 on the motor frame 10 in order to allow a restricted axial movement of the rotor tube 60. The lower end of the rotor tube 60 is rotatably mounted by means of a second ball bearing 64. The outer race of the ball bearing 64 is locked between a shoulder 67 on the lower housing 12 and a shoulder 69 on motor frame 10 when the motor frame 10 and lower housing 12 are assembled as previously described. The inner race of the ball bearing 64 is secured to a plurality of spaced radially outwardly projecting webs 71 on the lower end of the rotor tube 60 by means of arcuate-shaped clips 66 and cap screws 68 which thread into the lower end of the rotor tube 60. The clips 66 serve to lock the inner race of the ball bearing 64 against an outwardly projecting radial flange 73 on the lower end of the webs 71 which project from the rotor tube 60.

Figure 2:
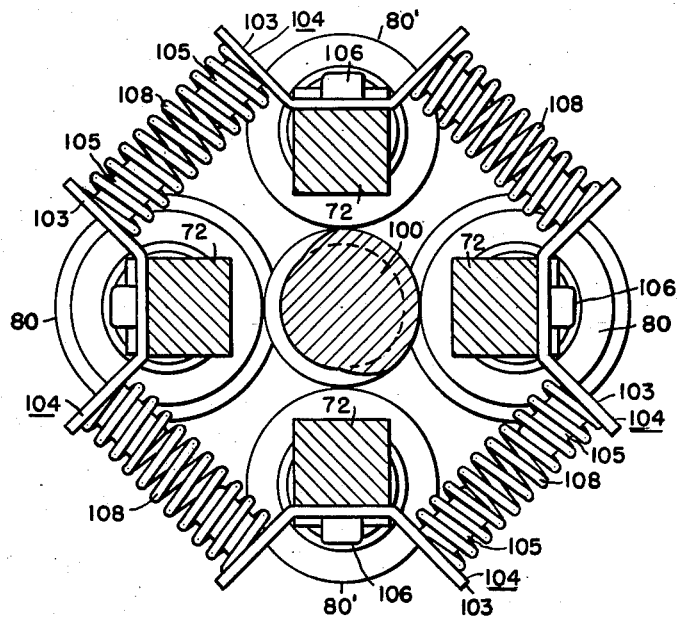
Fig. 2 is a partial transverse section taken along the line II—II of Fig. 1 and drawn to an enlarged scale.
Figure 3:
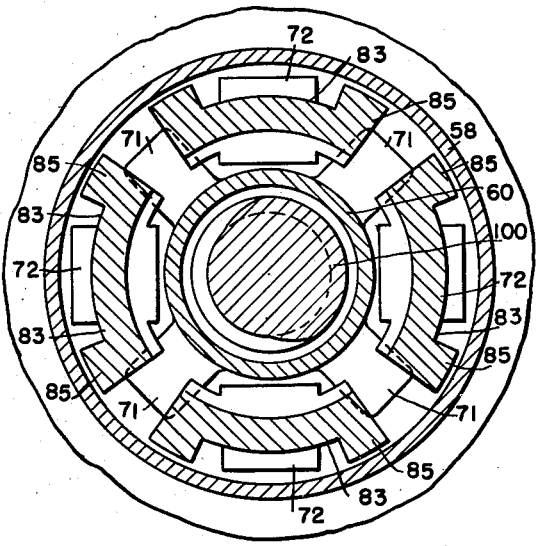
Fig. 3 is a partial transverse section taken along line III—III of Fig. 1 also drawn to an enlarged scale.

Pivoted about the inner race of ball bearing 64 are the rotor arms 72 (Figs. 1, 2 and 3) which serve a dual purpose. First, the lower end of the rotor arms are adapted to engage and disengage the segments of the expanding nut from the lead screw; and second, the opposite ends of the rotor arms serve to form parts of the salient pole structure of the rotor. As can be seen in Fig. 3, the upper portion of the rotor arms 72 are formed so that they contribute to the salient pole structure of the enlarged portion 59 of the rotor tube 60 previously described and are aligned with the salient pole structure of the rotor tube 60. Each rotor arm 72 has an upper portion which is formed in section in the shape of a sector of a circle which has a central groove 83 on the outside thereof to form outwardly projecting portions 85 at each side of the upper portion. The shape of the upper portion of the rotor arms 72 described above can readily be seen in Fig. 3.

One corner 75 of the inner race of ball bearing 64 serves as a pivot point for the pivoted rotor arms 72. Each rotor arm has formed on its outer surface a channel shaped radial groove 74 of which one corner 77 acts as a pivot about the pivot point 75 on inner race of the ball bearing 64. The segments of the expanding nut are attached to the lower ends 78 of the pivoted rotor arms 72, respectively. In the embodiment of our invention shown in Fig. 1 the segments of the expanding nut are comprised of four rollers 80 and 80', two of which 80 have two outwardly projecting spaced radial flanges 92 which are adapted to roll in engagement with threads 102 on the lead screw 100, and two of which 80' have plain surfaces (Fig. 2) and act as guide rollers. The radial flanges 92 are formed with converging sides so that they accurately fit the corresponding thread 102 on the lead screw 100. The rollers 80 and 80' in addition form the outer race of a ball bearing whose inner race is composed of two annular rings 84. Suitable bearing balls 82 are placed between the outer race 80 and the inner race 84 and serve to rotatably mount the rollers 80. The complete roller assembly is secured to the end of the pivoted rotor arms by means of a nut 88 and a lock washer 90. Spacer washers 86 are positioned at both end of the completed assembly so that the projecting flanges 92 on the rollers 80 can be accurately aligned with the threads 102 on the lead screw. While we have shown two of the rollers 80' with plain outer surfaces, it is apparent that all four of the rollers in Fig. 2 could have projecting flanges and act as drive rollers.

The upper or confined ends of the pivoted rotor arms 72 are retained in the rotor tube 60 by means of a projecting tongue 81 on each of the pivoted rotor arms 72. Each of the tongues 81 fits in an annular recess 79 formed in the enlarged section 59 of the rotor tube 60. The pivoted rotor arms 72 are spring biased adjacent their lower ends so that they will move the expanding nut segments out of engagement with the lead screw. As shown in Fig. 2, the expanding nut segments are engaged with the lead screw 100. The spring biasing arrangement is comprised of generally U-shaped clips 104 which have their bight portions attached to the pivoted rotor arms 72 by means of cap screws 106. Compression springs 108 are placed between adjacent ends 103 of clips 104, respectively, and are prevented from falling out of position between the two clips 104 by means of pin-like projections 105 on the ends 103 of the clips 104. The end projections 105 loosely fit the inner diameter of the compression springs 108 and serve to hold them in place, yet allow them freedom of movement.

We have thus provided a novel means for both mounting the rotor of our linear motion device and pivoting the rotor arms. The lower ball bearing 64 of our device serves two purposes, first to rotatably mount the rotor tube 60 and second to provide a pivot point for the rotor arms. Our design results in fewer parts and a simplified construction, and thus requires less maintenance, which is important in a device designed to operate in a system handling dangerous or explosive fluids and where any maintenance involves great expense.

As shown in Fig. 1, when the stator is energized and the upper ends of the pivoted rotor arms 72 are pulled outward towards the stator, the lower ends of the pivoted rotor arms move inward. This results from the magnetic field set up by the stator attracting the magnetic material from which the pivoted rotor arms are formed. Of course, as the upper ends of the rotor arms move outward, the lower ends move inwardly and the rollers 80 engage the lead screw 100. The direction and rate of travel of the lead screw 100 can then be easily controlled by controlling the frequency and sequence of the power supply. If it is desired to retain the lead screw in any fixed position all that is necessary is to reduce the power supply frequency to zero and while maintaining the stator energized. The upper ends of the pivoted arms 72 will thus remain in the outward position and the rollers will remain engaged with the lead screw. When it is desired to move the lead screw to its extreme lower position all that is necessary is to deenergize the stator winding. When the stator is deenergized, the upper ends of the pivoted rotor arms will no longer be attracted outwardly by the stator and thus the spring biasing arrangement shown in Fig. 2 will disengage the rollers from the lead screw. The lead screw will immediately be driven to its lowest position by the force of compressed spring 120, to be described later, and gravity. The lead screw will likewise be driven to its lowest position when the power supply fails since this will result in the deenergizing of the stator. It is assumed that the lowest position of the lead screw will be the closed position or safe position for the control element which the lead screw is positioning. Our linear motion device could easily be altered so that the lead screw is moved in the opposite or upward direction when the stator windings were deenergized instead of downward. We prefer to have it move downward in order to take advantage of the force of gravity to help drive the lead screw.

The valve stem, control element, or other device which it is desired to move in an axial direction may be attached to the lower end 110 of the lead screw 100 by any suitable means (not shown). The enlarged upper end 116 of the lead screw 100 shown in Fig. 1 has inwardly projecting longitudinal grooves 115 which slide axially in cooperation with outwardly projecting splines 118 on motor frame section 10, and serve to prevent rotation of the lead screw. Thus, when the rotor is rotated, the expanding nut will drive the lead screw in an axial direction instead of rotating the lead screw. A coiled compression spring 120 is contained in a hollow portion formed in the upper end of the lead screw 100 and seats against a shoulder 114 formed on the inner surface of the hollow portion of lead screw 100. The coiled spring 120 reacts against the upper end of the motor frame 10 to drive the lead screw in a downward direction when the stator is deenergized and the expanding nut is moved out of engagement with the lead screw. The enlarged end section 116 of the lead screw 100 also serves to prevent the lead screw from passing through the rotor tube 60 when the stator is deenergized and the lead screw is driven to its lowest position.

Two modifications of the roller type of expanding nut 80 for driving the lead screw 100 shown in Figs. 1 and 2 are shown in Figs. 5, 6 and 7. In Fig. 5 a ball 132 is rotatably mounted on supporting race 130 by means of two balls 131 which are held in position by means of retaining cap 133. Retaining cap 133 is secured to the lower end of a modified rotor arm 72' by means of cap screws 134 which pass through the rotor arm 72' and thread into retaining cap 133. Retaining cap 133 also serves to hold supporting race 130 in place as shown in Fig. 5. Two clips 135 (Fig. 6) hold the ball 132 in place when the rotor arm 72' is moved outward to disengage the balls 132 from the lead screw as described above for Fig. 1. Clips 135 are attached to retaining cap 133 by means of cap screws 136. In order to obtain a reasonable size for the balls 132, the lead screw 100 of Fig. 1 is replaced by a new lead screw 100' which has a higher pitch than lead screw 100.

In Fig. 7 the roller nut 80 of Fig. 1 is replaced by an expanding nut composed of rotatably mounted pins 140. The pins 140 have one end formed in the shape of a truncated cone 141 which engages the lead screw 100 and drives it in an axial direction. The pins 140 are rotatably mounted in one end of a modified rotor arm 72" by means of a double row ball bearing 142. A spring clip 143, which fits in a radial groove 145 formed on the other end of the pin 140, retains the pin 140 in place. Clip 146 is attached to rotor arm 72" by two small cap screws 144 and serves to retain the double row ball bearing 142 in place. While only two modified rotor arms are shown in Figs. 5, 6 and 7, the remaining rotor arms 72 shown in Fig. 1 may have plain faced rollers 80' mounted on their lower ends 78 as described above. The plain faced rollers 80' would act as guide rollers for lead screw 100' in Figs. 5, 6 and 7 in the same manner as described for Fig. 1.

Both of the modifications of the roller nut shown in Figs. 5 to 7 have only one element on each rotor arm to engage the lead screw which greatly simplifies the alignment of the element with the lead screw over the roller shown in Fig. 1. The roller 80 in Fig. 1 having two outwardly projecting ridges 92 may be difficult to align with the lead screw 100 so that each projecting ridge 92 supports its portion of the load.

Figure 8:
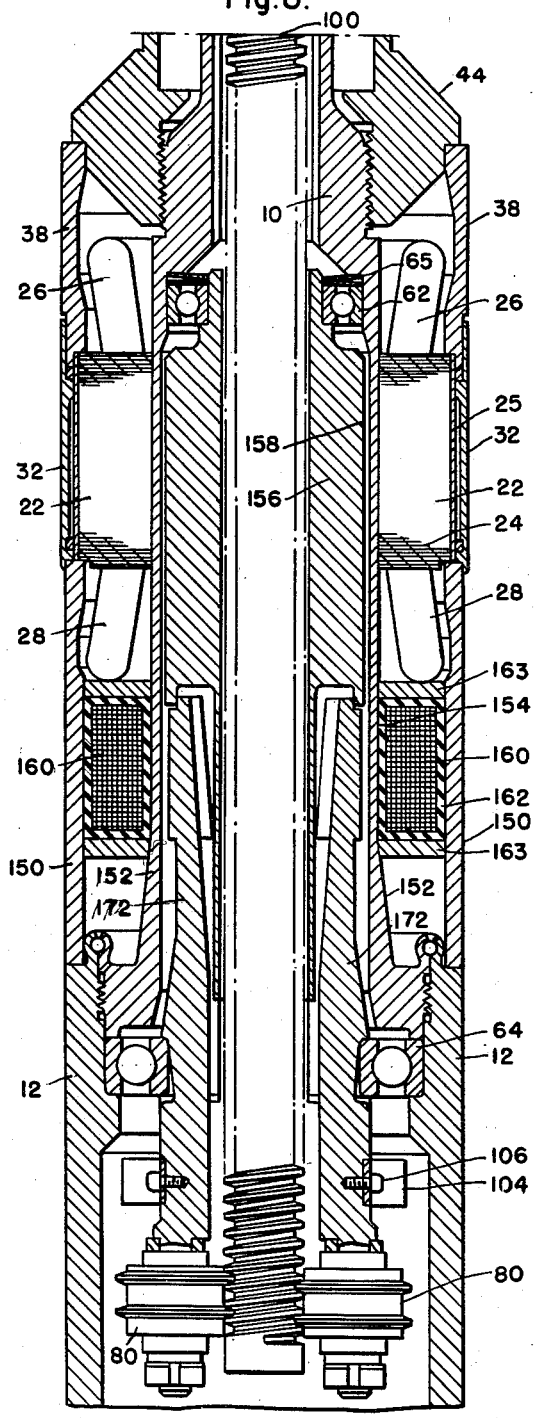
Fig. 8 is a longitudinal section of a second embodiment of our invention.

A second embodiment of our invention is illustrated in Fig. 8 and is generally similar to the embodiment illustrated in Fig. 1. The added novel feature of this embodiment is the addition of a circular electro-magnetic coil 160 for creating the magnetic field used in actuating the rotor arms 172, instead of utilizing the magnetic field of the stator 22 as in Fig. 1.

In order to provide for the space necessary for the magnetic coil 160, a modified tubular motor frame 152 is provided with a longer section 154 of uniform cross-section than the motor frame 10 of Fig. 1. A longer annular spacing ring 150 must also be provided instead of the spacing ring 20 of Fig. 1 for enclosing the lower end turns 28 of the stator winding as it, in addition, encloses the magnetic coil 160. A new rotor tube 156 is rotatably mounted by means of ball bearings 62 and 64 in the same manner as described for mounting rotor tube 60 of Fig. 1. Rotor tube 156 differs from rotor tube 60 in that it has an enlarged section 158 of increased length over the enlarged section 59 of rotor tube 60 which is made possible by removal of the rotor arms 172 from the area adjacent the stator windings 22. The enlarged section of the rotor 156 is made at least as long as the stator laminations 24 whose length depends on the power desired of the motor.

The uniform section 158 of rotor tube 156 has formed on its outer surface longitudinal grooves (not shown) which form the salient pole structure of this embodiment, as is well known in the motor field. The circular electromagnetic coil 160 is enclosed in a suitable housing 162 preferably of an insulating material, such as a synthetic resin, and is installed on the outer surface of motor frame 152 adjacent the upper end of the rotor arms 172. Rings 163, preferably of a magnetic material such as soft iron, are placed at each end of the coil 160 to increase its magnetic field and thus increase the outward radial force on the rotor arms 172. The remaining details of construction and the method of assembling the various parts are the same as described and shown in Fig. 1 and accordingly, such similar parts are indicated by the same reference numerals, and their description will not be repeated.

The embodiment of our invention described above has several advantages over the embodiment shown in Fig. 1. First, the motor unit has more torque and thus the axial movement of the lead screw will be more forceful and positive. The added motor torque is due to the fact that the rotor tube 156 has an increased amount of magnetic material in the magnetic field of the stator 22. This arrangement is not possible in the embodiment of Fig. 1 because the rotor arms 172 must extend into the magnetic field of the stator in order to be actuated by the stator field thus preventing the use of a rotor tube similar to 156 of Fig. 8. Another advantage is the ability to engage or disengage the expanding nut from the lead screw 100 without regard to the energizing or deenergizing of the stator winding. This is important because it allows the lead screw to be locked in any axial position without having the stator windings energized, which in turn, considerably reduces the heat generated in the stator laminations 24. This embodiment will also fail safe in case of failure of the power supply since the magnetic coil 160 acts in the same manner as the stator of Fig. 1 in actuating the rotor arms.

A third embodiment of our invention is illustrated in Fig. 9 and is generally similar to the embodiment illustrated in Fig. 1. This embodiment, in addition to including all of the novel features of the embodiment illustrated in Fig. 1, includes a novel rotor construction where all of the salient pole structure of the rotor is formed by the pivoted rotor arms. This arrangement, while somewhat decreasing the torque delivered by the motor, greatly increases the radial force tending to move the upper ends of the pivoted rotor arms radially outward and the lower ends inwardly. This increased radial force is due to the increased amount of magnetic material, from which the rotor arms are fabricated, being acted upon by the magnetic field of the stator windings. The increased length of the rotor arms also increases the above radial force due to the increased lever arms. This embodiment is particularly desirable where the linear motion device will be subject to considerable vibration and sudden shocks, as the increased radial force will maintain the expanding nut in engagement with the lead screw.

In this embodiment, the stator is assembled as a separate unit and inserted into the outer casing 202 of the linear motion device instead of being slipped on the outer surface of the motor frame as shown in Fig. 1. The outer casing 202 is attached at its lower end 203 to the valve body or other equipment containing the element it is desired to position (not shown).

The stator assembly 208 is comprised of a tubular shaped stator housing 204 containing suitable stator laminations 210 similar to stator laminations 22 of Fig. 1. The stator laminations 210 are stacked between suitable end rings 214 and 216 and held together by any suitable means, such as welding along the outer surface of the stacked stator laminations 210. A suitable winding having end turns 212 at opposite ends is placed in slots (not shown) in the stator laminations 210. The end turns 212 are enclosed at their upper end by a suitable cylindrical back up member 218 and at their lower end by another cylindrical back up member 220. Back up member 220 may be attached to the lower end of stator housing 204 by any suitable means such as welding the member 220 to the housing 204 as shown in Fig. 9. Back up member 218 is attached to the upper end of the stator housing 204 by similar means, such as welding member 218 to the stator housing. The stator laminations and windings are hermetically sealed in the stator housing 204 by a thin walled cylindrically shaped member 222, which is welded at both ends to the adjacent back up members 218 and 220. By means of the above-described construction, we have isolated the stator windings of our device so that the fluid contained in the valve or other equipment containing the control element may freely circulate around the rotor of our linear motion device. Thus, we have eliminated the need for mechanical seals between our linear motion device and equipment containing the element being positioned in order to isolate the fluid in the equipment.

A rotor tube 228, similar to rotor tube 60 of Fig. 1, is rotatably mounted in the stator assembly by means of ball bearings 229 and 230. The outer race of the upper bearing 229 sets against an inwardly projecting shoulder on the inner surface of end cap 224 and the inner race of the bearing sets against an outwardly projecting shoulder formed on the end of rotor tube 228. The outer race of the lower bearing 230 is rigidly secured between an inwardly projecting shoulder 232 formed on the inner surface of back up member 220 and a flat ring-shaped retainer 234. Retainer 234 is attached to back up member by any suitable means such as small cap screws (not shown). The inner race of bearing 230 is secured to the rotor tube 228 by means similar to that shown in Fig. 4 for securing the inner race of bearing 64 to the rotor tube 60 of Fig. 1. Pivotally mounted on the rotor tube 228 by means of one corner 248 of the inner race of ball bearing 230 are a plurality of rotor arms 240. The portions of the rotor arms 240 adjacent the stator windings form the salient poles of the rotor in this embodiment of our invention, and have the same cross-sectional shape as shown in Fig. 3 for the rotor arms 72 of Fig. 1. The rotor arms 240 are prevented from over-traveling in a radial direction when the stator windings are energized by a small tongue 242 on their upper ends, each of which fits in an oblong-shaped radial slot 244.

Slot 244 is formed in a radial flange 246 which projects outwardly from the upper end of the rotor tube 228. A spring biasing arrangement 250, identical to that shown in Fig. 2, moves the upper end of the rotor arms 248 inwardly against the rotor tube 228 when the stator windings are deenergized so as to disengage the roller drive 252. The lead screw 100, which is identical to the lead screw shown in Fig. 1, is driven by an expanding roller nut assembly 252. Roller nut assembly is of the same construction as the roller nut 80 shown in Fig. 1.

In this embodiment, we have provided a linear motion device incorporating our invention where the pivoted rotor arms extend completely through the stator field. By extending the rotor arms through the stator field, we have greatly increased the radial force on the rotor arms, and thus increased the inward radial force tending to keep the expanding nut 252 engaged with the lead screw 100. This is very important where the linear motion device will be subjected to shock and vibration which would tend to disengage the nut from the lead screw.

As can be seen from the above description, we have provided three embodiments of our linear motion device which fail safe. By failing safe we mean that when the power supply for the stator assembly 22 and/or the electromagnetic coil 160 is interrupted or fails, the expanding nut is moved out of engagement with the lead screw 100 and the coiled compression spring 120 will immediately drive the lead screw 100 to its extreme downward position. This extreme downward position, of course, can be designed as the safe position for the device which our linear motion device is actuating. In addition, by utilizing a low frequency 3-phase power supply an accurate record of the position of the lead screw can be maintained by maintaining a record of the power supply. If the supply frequency is made variable, the speed of movement as well as the direction of the lead screw can be accurately controlled. In addition our linear motion device has a minimum of parts thus making it easy to manufacture and relatively free of maintenance.

We claim as our invention:

1. A linear motion device comprising an electric motor having a stator and rotor, a lead screw, means driven by said electric motor for driving said lead screw, said drive means being movable into and out of engagement with said lead screw and additional means responsive to the magnetic flux of said stator for engaging said drive means.

2. A linear motion device comprising an electric motor having a stator and rotor, a lead screw, means driven by said electric motor for driving said lead screw, said drive means being movable into and out of engagement with said lead screw and additional means responsive to the magnetic flux of said stator in cooperation with a biasing means for engaging and disengaging said drive means.

3. A linear motion device comprising, an electric motor having a stator and rotor, members pivotally mounted on said rotor, a lead screw and a segmented nut for driving said lead screw, each of said nut segments being mounted on said members, respectively, and means responsive to the magnetic flux of said stator for moving said members so as to engage said nut segments with said lead screw.

4. A linear motion device comprising an electric motor having a frame, a wound stator mounted on said motor frame, a rotor rotatably mounted in said motor frame and having a plurality of arms pivotally mounted on said rotor each on an axis at an angle to the axis of the rotor, a lead screw, an expanding nut for driving said lead screw, said nut being composed of a plurality of segments and each of said expanding nut segments being mounted on said rotor arms, respectively.

5. A linear motion device comprising an electric motor having a frame, a wound stator mounted on said motor frame, a rotor having a hollow bore and rotatably mounted in said motor frame, a plurality of arms pivotally mounted on said rotor each on an axis at an angle to the axis of the rotor, a lead screw adapted to pass through said hollow bore of the rotor, an expanding nut for driving said lead screw, said nut being composed of a plurality of segments, and each of said expanding nut segments being mounted on said rotor arms, respectively.

6. A linear motion device comprising, an electric motor having a frame, a wound stator mounted on said motor frame, a rotor having a hollow bore and rotatably mounted in said motor frame, a plurality of arms pivotally mounted on said rotor each on an axis at an angle to the axis of the rotor, a lead screw adapted to pass through said hollow bore of the rotor, an expanding nut composed of a plurality of segments for driving said lead screw, each of said expanding nut segments being mounted on said rotor arms, respectively, and means for engaging and disengaging said nut segments from said lead screw.

7. A linear motion device comprising, an electric motor having a frame, a wound stator mounted on said motor frame, a rotor having a hollow bore and rotatably mounted in said motor frame, a plurality of arms pivotally mounted on said rotor each on an axis at an angle to the axis of the rotor, a lead screw adapted to pass through said hollow bore of the rotor, an expanding nut composed of a plurality of segments for driving said lead screw, each of said expanding nut segments being mounted on said rotor arms respectively, means for engaging and disengaging said nut from said lead screw, and additional means for moving said lead screw in an axial direction when said nut is disengaged.

8. A linear motion device comprising, an electric motor having a frame, a wound stator mounted on said motor frame, a rotor having a hollow bore and rotatably mounted in said motor frame, a plurality of arms pivotally mounted on said rotor each on an axis at an angle to the axis of the rotor, a lead screw adapted to pass through said hollow bore of the rotor, an expanding nut composed of a plurality of segments for driving said lead screw, each of said segments being mounted on said rotor arms, respectively, means for moving said rotor arms in opposite directions to engage and disengage said expanding nut segments from said lead screw, including means biasing said arms at one end in one of said directions.

9. A linear motion device comprising, an electric motor having a frame, a wound stator mounted on said motor frame, a rotor having a hollow bore and rotatably mounted in said motor frame, a plurality of arms pivotally mounted on said rotor each on an axis at an angle to the axis of the rotor, a lead screw adapted to pass through the hollow bore of said rotor, an expanding nut composed of a plurality of segments for driving said lead screw, each of said segments being mounted on said rotor arms, respectively, means for engaging and disengaging said expanding nut segments from said lead screw, and additional means comprising a compressed spring for moving said lead screw in an axial direction when said expanding nut segments are disengaged.

10. A sealed linear motion device comprising a solid tubular motor frame closed at one end, a second tubular frame adapted to be removably sealed to the other end of said motor frame, a wound stator positioned on the outer surface of said motor frame, a rotor having a hollow bore and rotatably mounted in said motor frame, a plurality of arms pivotally mounted between their ends on said rotor each on an axis at an angle to the axis of the rotor, one end of each of said arms extending adjacent the position of said stator core, a lead screw adapted to pass through said hollow bore rotor, an expanding nut composed of a plurality of segments for driving said lead screw, each of said segments being mounted on the other ends of said rotor arms, respectively, and means for moving said arms in opposite directions to engage and disengage said expanding nut segments from said lead screw including means for biasing the ends of said arms on which said expanding nut segments are mounted to move said arms in one of said directions.

11. A linear motion device comprising, an electric motor having a stator and rotor, a plurality of arms pivotally mounted on said rotor each on an axis at an angle to the axis of the rotor, a lead screw, an expanding nut for driving said lead screw composed of a plurality of segments, each of said segments being comprised of a roller having outwardly projecting flanges, each of said rollers being rotatably mounted on said rotor arms, respectively, so that the projecting flanges on said roller can engage said lead screw and drive the lead screw in an axial direction.

12. A linear motion device comprising, an electric motor having a stator and rotor, said rotor having a hollow bore, a plurality of arms pivotally mounted on said rotor each on an axis at an angle to the axis of the rotor, a lead screw adapted to pass through the hollow bore of said rotor, an expanding nut for driving said lead screw, said nut being composed of a plurality of rollers having outwardly projecting flanges, each of said rollers being rotatably mounted on said rotor arms, respectively, so that the projecting flanges on said rollers can engage said lead screw, means responsive to the magnetic flux of said stator for moving said arms and including means for biasing one end of said arms.

13. A linear motion device comprising an electric motor, a stator, a tubular rotor rotatably mounted in said motor, a plurality of arms pivotally mounted between their ends on said rotor each on an axis at an angle to the axis of the rotor, one end of each of said arms being opposite the position of said stator, a lead screw adapted to pass through said tubular rotor, an expanding nut for driving said lead screw, said nut being composed of a plurality of rollers having outwardly projection flanges, said rollers being rotatably mounted on said other end of the rotor arms, respectively, so that the flanges on said roller can engage said lead screw, and biasing means for said other ends of said rotor arms so that said other ends move outward when said stator winding is deenergized and inwardly when said stator windings are energized.

14. A sealed linear motion device comprising, a solid tubular motor frame closed at one end, a wound stator core positioned on the outer surface of said motor frame, a tubular rotor rotatably mounted in said motor frame, a plurality of arms pivotally mounted between their ends on said rotor each on an axis at an angle to the axis of the rotor, one end of each of said arms being opposite the position of said stator core, a lead screw adapted to pass through said tubular rotor, an expanding nut for driving said lead screw, said nut being composed of a plurality of rollers having outwardly projecting flanges, said rollers being rotatably mounted on the other ends of the rotor arms, respectively, so that the flanges on said rollers can engage said lead screw and biasing means for said other end of the rotor arms so that said other end of each rotor arms will move outwardly when said stator winding is deenergized and inwardly when said stator winding is energized.

15. A linear motion device comprising an electric motor having a stator and rotor, a lead screw, means driven by said motor having a part movable into and out of driving engagement with said lead screw, additional means responsive to the magnetic flux of an electromagnet for engaging said part of said drive means.

16. A linear motion device comprising an electric motor having a stator and rotor, a lead screw, means driven by said motor having a part movable into and out of driving engagement with said lead screw including arms pivoted on said rotor and an expanding nut, additional means responsive to the magnetic flux of an electromagnet in cooperation with a biasing means for engaging and disengaging said drive means.

17. A linear motion device comprising an electric motor having a rotor and a stator, pivoted arms mounted on said rotor each on an axis at an angle to the axis of the rotor, an electromagnet mounted on said motor adjacent one end of said pivoted arms, a lead screw, an expanding nut mounted on the other end of said arms for driving said lead screw and said pivoted arms being actuated by the flux of said electromagnet to engage said expanding nut with said lead screw.

18. A linear motion device comprising a tubular motor frame, a wound stator positioned on the outer surface of said motor frame, a rotor rotatably mounted in said motor frame, a plurality of arms pivotally mounted on said rotor each on an axis at an angle to the axis of the rotor, an electromagnet mounted on the outer surface of said motor frame adjacent one end of said pivoted arms, a lead screw, an expanding nut comprised of a plurality of segments for driving said lead screw, each of said segments being mounted on the other end of said arms, respectively.

19. A linear motion device comprising, a tubular motor frame, a wound stator positioned on the outer surface of said motor frame, a rotor having a hollow bore rotatably mounted in said motor frame, a plurality of arms pivotally mounted on said rotor each on an axis at an angle to the axis of the rotor, a lead screw adapted to pass through the hollow bore of said rotor, an expanding nut composed of a plurality of balls for driving said lead screw, said balls being rotatably mounted on said rotor arms, respectively, so as to rotate at least about an axis perpendicular to the axis of said lead screw, and means for engaging and disengaging said expanding nut from said lead screw.

20. A linear motion device comprising a tubular motor frame, a wound stator positioned on the outer surface of said motor frame, rotor having a hollow bore rotatably mounted in said motor frame, a plurality of arms pivotally mounted on said rotor each on an axis at an angle to the axis of the rotor, a lead screw adapted to pass through the hollow bore of said rotor, an expanding nut composed of a plurality of elements for driving said lead screw, said elements being rotatably mounted on said rotor arms, respectively, so as to rotate thereon about an axis perpendicular to the axis of said lead screw, and means for engaging and disengaging said expanding nut from said lead screw.

21. A linear motion device comprising, an electric motor having a rotor and stator, said rotor being tubular and having a plurality of pivoted arms mounted thereon on an axis at an angle to the axis of the rotor, one end of each of said pivoted arms extending through the field of said stator, a lead screw, a segmented nut for driving said lead screw, each of said nut segments being mounted on said arms, respectively, and means responsive to the magnetic flux of said stator for moving said arms to engage said segmented nut with said lead screw.

22. A linear motion device comprising an electric motor having a rotor and stator, said rotor being tubular and having a plurality of pivoted arms mounted thereon on an axis at an angle to the axis of the rotor, one end of said pivoted arms extending through the field of said stator, a lead screw, an expanding nut consisting of a plurality of segments for driving said lead screw, each of said nut segments being mounted on the other end of said pivoted arms, respectively, and means responsive to the magnetic flux of said stator in cooperation with a biasing means for engaging and disengaging said nut segments with said lead screw.

References Cited in the file of this patent
UNITED STATES PATENTS

| | | |
|---|---|---|
| 955,816 | Lippert | Apr. 19, 1910 |
| 2,501,298 | Winchell | Mar. 21, 1950 |